United States Patent [19]
Ojima et al.

[11] Patent Number: 5,191,683
[45] Date of Patent: Mar. 9, 1993

[54] HOSE BAND

[75] Inventors: Juji Ojima, Aikawa; Isao Hino, Komagane, both of Japan

[73] Assignee: NHK Spring Co., Ltd., Yokohama, Japan

[21] Appl. No.: 804,583

[22] Filed: Dec. 10, 1991

[30] Foreign Application Priority Data

Dec. 12, 1990 [JP] Japan .................................. 2-410475

[51] Int. Cl.⁵ .............................................. B65D 63/00
[52] U.S. Cl. .................................. 24/20 R; 24/20 CW; 24/20 EE
[58] Field of Search ............ 24/20 R, 20 CW, 20 EE, 24/20 TT, 20 S, 20 LS, 20 W, 23 EE, 16 R

[56] References Cited

U.S. PATENT DOCUMENTS

| 41,630 | 2/1864 | McBurney | 24/20 EE |
| 554,446 | 2/1896 | Jones | 24/20 EE |
| 1,330,737 | 2/1920 | Coffman | 24/20 EE |
| 4,237,584 | 12/1980 | Oetiker | 24/20 CW |
| 4,299,012 | 11/1981 | Oetiker | 24/20 LS |
| 4,724,583 | 2/1988 | Ojima | 24/20 CW |
| 4,750,242 | 6/1988 | Calmettes et al. | 24/20 R |

Primary Examiner—Victor N. Sakran
Attorney, Agent, or Firm—Keck, Mahin & Cate

[57] ABSTRACT

Both end sides of a ring band member in a hose band having both end sides opened are fixedly attached to a clamping ear member. Bevelling is provided at edge portions of a tongue and a tongue receiving portion is formed at both ends of the above band member so as to be thinner toward the outside. The hose is thereby prevented from forming creases during clamping.

2 Claims, 3 Drawing Sheets

HOSE BAND

BACKGROUND OF THE INVENTION

This invention relates to a hose band used for fixing a hose or a hose-like member which consists of a rubber, a hard resin or the like.

FIG. 10 shows a conventional hose band 21. In FIG. 10, the hose band 21 is constructed of a metallic band member 22, rounded to a ring form by opening both ends thereof, and a metallic clamping ear member 23 having a clamping ear portion 23a which is fixed to the band member 22 by spot welding so as to seal a portion between both end portions 22a and 22b of the band member 22 from the outside.

The hose band 21 is, after being inserted into the outer periphery of the hose 24 as shown in FIG. 10, allowed to deform non-elastically the clamping portion 23a of the clamping member 23 with a jig, thereby fixing the hose 24 by the clamping force of the hose 24, as shown in FIG. 11.

However, when the hose is clamped by deforming non-elastically, the clamping ear portion 23a, the inner periphery edge portion of both end portions 22a, 22b of the band member 22 cut into the surface of the hose 24, which causes creases 24a at hose 24. The sealing property of this portion is thereby impaired.

In view of the above problem, the object of the subject invention is to provide a hose band which does not cause creases, even if the hose is clamped by non-elastic deformation of the clamping ear portion.

SUMMARY OF THE INVENTION

This invention is characterized by the part of the hose band where both sides of a ring band member having both ends open is attached to the ear portion, and bevelings are formed which become thinner toward the outside at the edge of a tongue or a tongue-receiving portion formed at both ends of the above band member.

As a result of the above, since the bevelling, which becomes thinner toward the outside, is formed at the edge of the tongue and tongue receiving portion which are both ends of the band member, the inner periphery edge portions at both ends of the band member disappear, and the cutting into of the hose surface of both end portions also disappears, thereby preventing the occurrence of the crease.

DETAILED DESCRIPTION OF THE INVENTION

An embodiment of this invention will be described as follows according to FIGS. 1 through 7.

Figure 1:
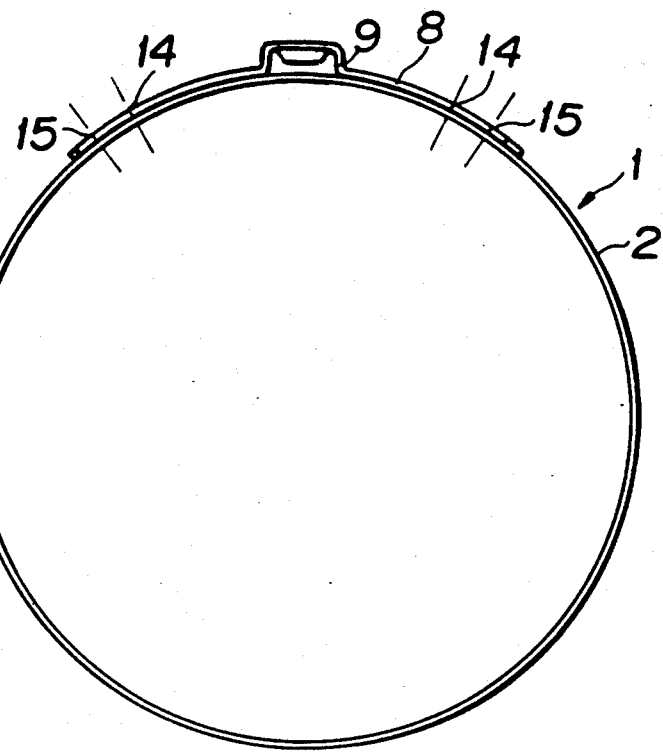
FIG. 1 is a front view of the hose band.
Figure 2:
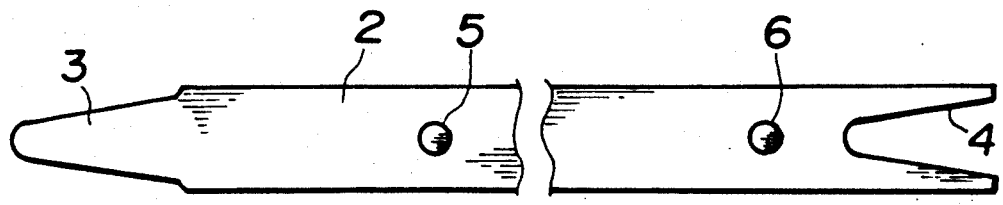
FIG. 2 is a plan view of the band member.
Figure 3:
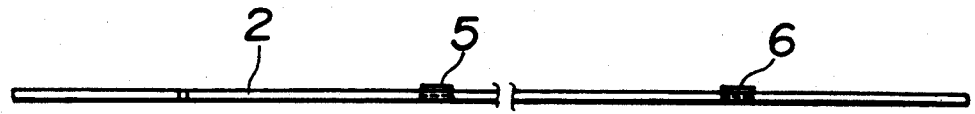
FIG. 3 is a front view of FIG. 2.

In FIGS. 1 through 3, the band member 2 which constructs the hose band 1 consists of metal, such as stainless steel or the like, one end of which forms a tongue 3, while another end forms a tongue receiving member 4. In the vicinity of both end portions of this band member 2, latching projections 5 and 6 are provided for positioning.

Figure 4:
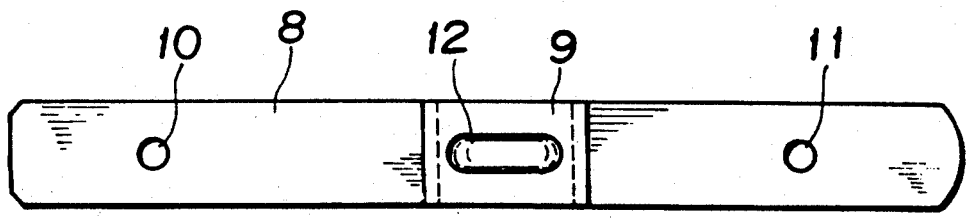
FIG. 4 is a plan view of the clamping ear member.
Figure 5:
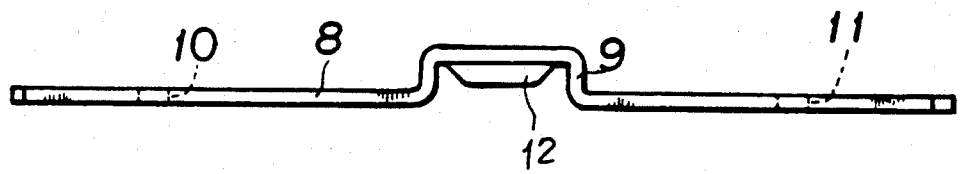
FIG. 5 is a front view of FIG. 4.

On the other hand, a clamping ear member 8 which constructs the hose band 1 consists of a metal such as stainless steel or the like, and, as shown in FIG. 4 and FIG. 5, the clamping ear portion 9 is formed at the central portion thereof, both sides having latching holes 10 and 11 for positioning. Further, number 12 of figures is a reinforcement rib formed at the ear portion 9.

Band member 2 is rounded to form a ring and latching projections 5, 6 are latched to latching holes 11, 10, respectively, of the clamping ear portion 8 to position each portion 14 (FIG. 1). Then, the end portions of the clamping ear portions 8 are spot welded (FIG. 1) to integrate both members.

Figure 6:
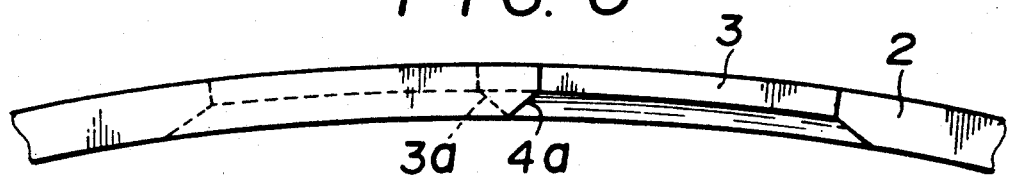
FIG. 6 is an enlarged front view of a material portion of an embodiment of the invention.
Figure 7:
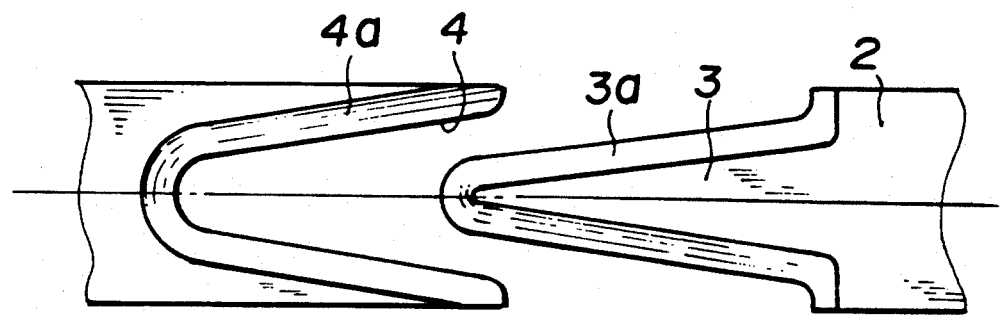
FIG. 7 is a bottom view of FIG. 6

In this embodiment, the tongue 3 of one end of the band member 2 is provided with a bevelling portion 3a which becomes thinner towards the outside through the whole periphery of the edge portion thereof as shown in FIG. 6 and 7. The tongue receiving portion 4 of another end is also provided with a bevelling portion 4a which becomes thinner toward the outside through the whole periphery of the edge portion thereof.

Accordingly, since the bevelling portions 3a and 4a, which become thinner toward the outsides are respectively provided at the whole periphery of each edge portion of the tongue 3 and the tongue receiving portion 4 at both ends of the band member 2, the hose band 1 does not cut into the hose even if the clamping ear portion 9 is deformed non-elastically by inserting the hose band 1 through the hose, because both ends of the band member 2 lack the inner edge portions. Thus, the occurrence of the creases can be prevented and the sealing property can also be increased.

Figure 8:
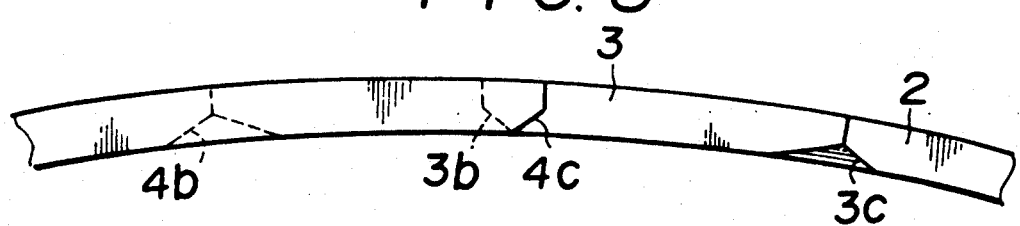
FIG. 8 is an enlarged front view of a material portion of another embodiment of the invention.
Figure 9:
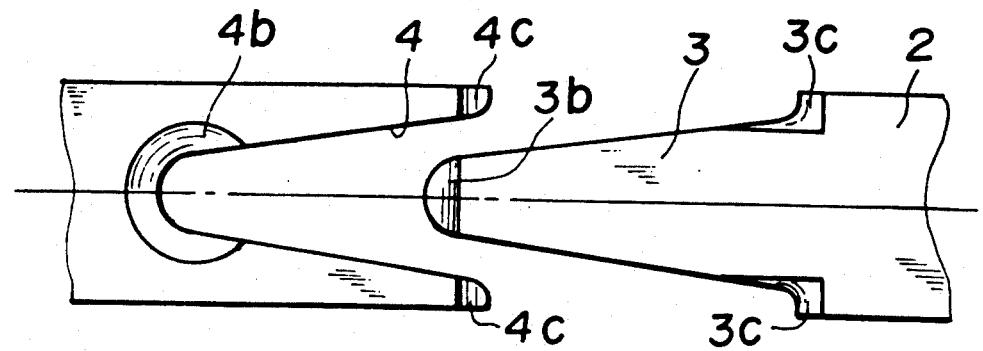
FIG. 9 is a bottom view of FIG. 8.
Figure 10:
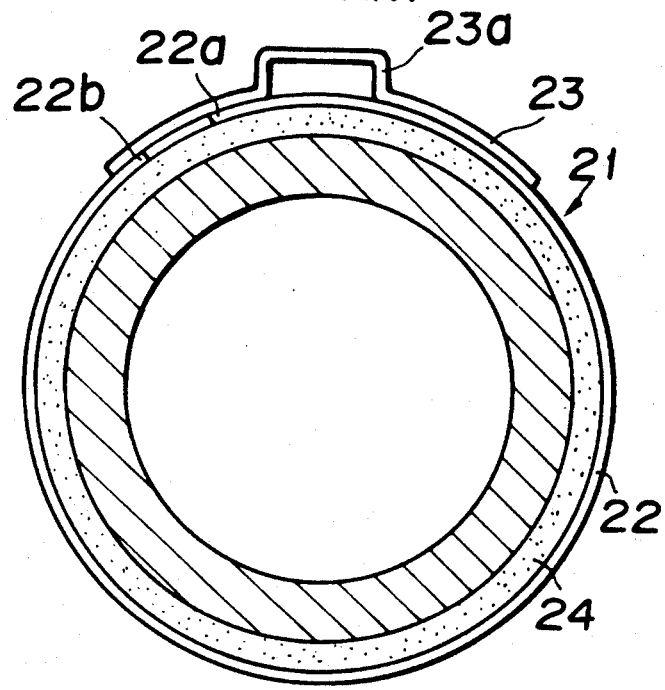
FIG. 10 is a sectional view before the clamping state of the conventional hose band.
Finally.
Figure 11:
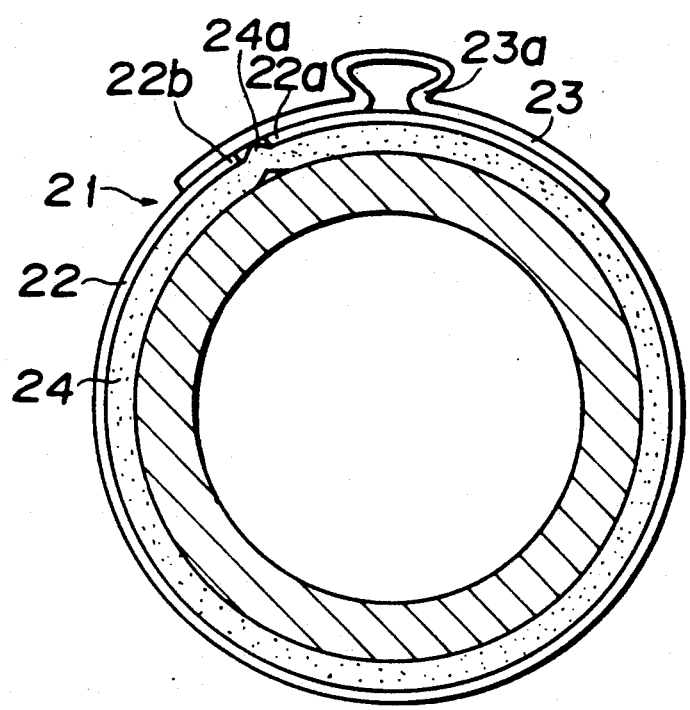
FIG. 11 is a sectional view during the clamping state of the conventional hose band.

FIG. 8 and FIG. 9 represent another embodiment of this invention. Here, edge portions of the tongue 3 and the tongue receiving portion 4 of both ends of the band member 2 are provided with bevelling portions 3b, 3c, 4b, 4c which become thinner toward the outside, concentrating upon a portion which intersects vertically in a sliding direction.

Even in this embodiment, if the clamping ear portion 9 is deformed non-elastically, the cutting-in effect of both ends of the band member 2 into the hose does not occur in the same manner as in the above embodiment because in the edge portions of the tongue 3 and the tongue receiving portion 4 at both ends of the band member 2, the portions which intersect vertically in a sliding direction with respect to the hose are bevelled concentratingly (3b, 3c, 4b, 4c). Accordingly, creasing can be prevented and the sealing property can also be increased.

Furthermore, the hose band of this invention is available even in the case of, for instance, the fixing of a bellows portion of a boot for constant velocity joint.

As described above, since the bevelling, which becomes thinner toward the outside, is formed at the edges of the tongue and the tongue receiving portion thereof at both ends of the band member, the inner edge portions at both end parts of the band member disappear, and the cutting-in of the hose on both sides of this band member also disappears. Accordingly, creasing can be prevented and the sealing performance thereby increased.

We claim:

1. A hose band comprising an elongated ring band member having separated ends, each said end being fixed to a clamping ear member, a first of said ends comprising a tongue portion and a second of said ends comprising a tongue receiving portion, each said end comprising at least one bevelled surface becoming thinner toward an outside edge thereof and disposed in corresponding positions for engaging together in clamped position of said ring band member.

2. A hose band according to claim 1 wherein, in clamped position, said tongue portion and said tongue receiving portion overlie each other over the bevelled surfaces only.

* * * * *

UNITED STATES PATENT AND TRADEMARK OFFICE
CERTIFICATE OF CORRECTION

PATENT NO. : 5,191,683
DATED : March 9, 1993
INVENTOR(S) : Juji OJIMA ET AL

It is certified that error appears in the above-indentified patent and that said Letters Patent is hereby corrected as shown below:

On the title page, item:

-- [73] Assignees: NHK Spring Co., Ltd.
                                          Yokohama-Shi Mihama Manufacturing Co., Ltd.
                          Chino-Shi
           JAPAN NHK Sales Co., Ltd.

Tokyo, JAPAN --

Signed and Sealed this

Twenty-fourth Day of March, 1998

Attest:

BRUCE LEHMAN

*Attesting Officer*          *Commissioner of Patents and Trademarks*